(12) United States Patent
Akashi et al.

(10) Patent No.: US 7,746,542 B2
(45) Date of Patent: Jun. 29, 2010

(54) MULTICOLOR DISPLAY OPTICAL COMPOSITION, OPTICAL DEVICE, AND DISPLAY METHOD OF OPTICAL DEVICE

(75) Inventors: Ryojiro Akashi, Kanagawa (JP); Daisuke Nakayama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 363 days.

(21) Appl. No.: 11/438,250

(22) Filed: May 22, 2006

(65) Prior Publication Data

US 2007/0121193 A1    May 31, 2007

(30) Foreign Application Priority Data

Nov. 25, 2005  (JP) .............................. 2005-339875

(51) Int. Cl.
*G02B 26/00* (2006.01)
(52) U.S. Cl. ...................... 359/296; 359/483; 359/485; 349/2; 315/169.4; 252/582
(58) Field of Classification Search .................. 252/582; 359/296, 483; 349/2; 315/169.4
See application file for complete search history.

(56) References Cited

U.S. PATENT DOCUMENTS

| 6,785,035 | B2 * | 8/2004 | Uematsu et al. ............. 359/265 |
| 6,876,476 | B1 * | 4/2005 | Miura et al. ................. 359/252 |
| 2006/0284829 | A1 * | 12/2006 | Moriyama et al. .......... 345/107 |
| 2007/0008439 | A1 * | 1/2007 | Nakayama et al. ............. 349/2 |
| 2007/0206270 | A1 |  9/2007 | Iwamatsu et al. |

FOREIGN PATENT DOCUMENTS

| JP | 2002-162653 | 6/2002 |
| JP | 2003-202402 | 7/2003 |
| JP | 2004-46224 | 2/2004 |
| JP | 2005-31172 | 2/2005 |
| WO | 2005/071479 | 8/2005 |

OTHER PUBLICATIONS

K. Lee, S. A. Asher, J. Am. Chem. Soc., 122, 9534 (2000).
T. Iyoda, et al., Polymer Preprints, Japan, 50 (3), 472 (2001).
H. Fudouzi and U. Xia, Adv. Mater., 15, 892-896 (2003).
A document of Iridigm Corp (USA).

* cited by examiner

*Primary Examiner*—Ling-Siu Choi
*Assistant Examiner*—Bijan Ahvazi
(74) *Attorney, Agent, or Firm*—Fildes & Outland, P.C.

(57) ABSTRACT

The present invention provides a multicolor display optical composition comprising a dispersion medium, a periodic structure having a porous structure inside communicated with the outside, and mobile particles contained in the dispersion medium so as to be movable and having a volume average primary particle diameter from 1 nm to 80 nm in a dispersion state in the dispersion medium, a volume average particle diameter of coagulated particles of 100 nm or larger in optical coagulation state by stimulation application, and having a refractive index different from that of the dispersion medium by 0.1 or more, wherein the mobile particles show no coloration in the dispersion state when the particles are dispersed in the dispersion medium and show white coloration with a predetermined whiteness value or higher in the coagulation state when the particles are coagulated, an optical device, and a display method of the optical device.

5 Claims, 9 Drawing Sheets

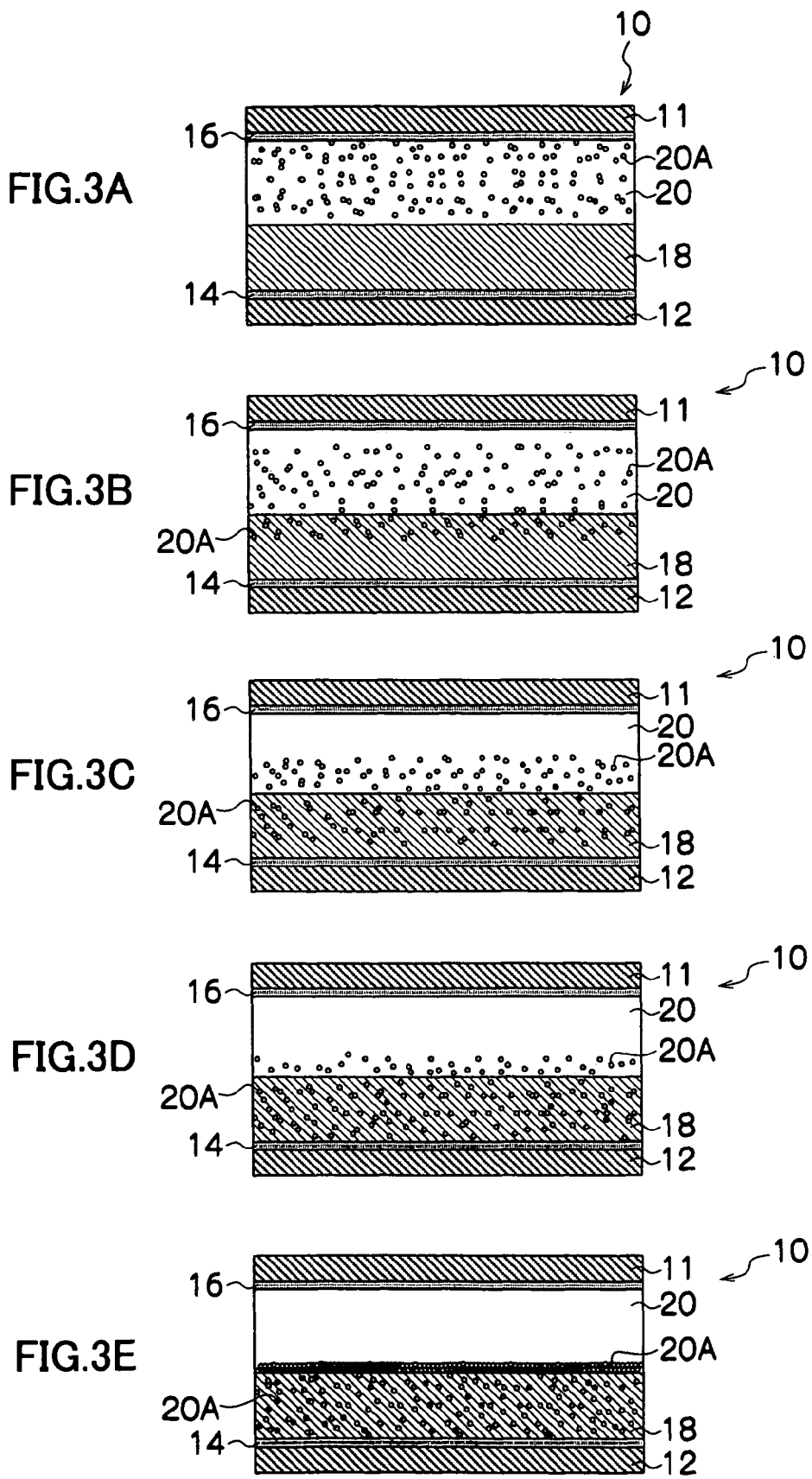

MULTICOLOR DISPLAY OPTICAL COMPOSITION, OPTICAL DEVICE, AND DISPLAY METHOD OF OPTICAL DEVICE

CROSS-REFERENCE TO RELATED APPLICATION

This application claims priority under 35 USC 119 from Japanese Patent Application No. 2005-339875, the disclosure of which is incorporated by reference herein.

BACKGROUND

1. Technical Field

The present invention relates to a multicolor display optical composition, an optical device, and a display method of the optical device and particularly to a multicolor display optical composition employing periodic structures, an optical device, and a display method of the optical device.

2. Related Art

In recent years, display systems/color modulating systems employing color emitting mechanisms of "structural colors" using periodic structural bodies in sub-micro scale (regular structural bodies) have been proposed. To date, color emission of structural colors using periodic structural bodies such as colloidal crystals of mono-dispersion particles of silica and polymers, micro-domain structures of block copolymers, and lamellar structures of surfactants have been reported.

For example, periodic structures each consist of orderly and densely arranged spherical particles, which are a plurality of the structural units, and an externally stimulating unit for stimulating the periodic structures are employed. Structural color alteration is made by changing the cycles of the periodic structures by changing the particle diameter composing the periodic structures by applying voltage by the externally stimulating unit.

A technique enables easy design of switching of opacity and a desired colored state by employing structures having spherical spaces arranged cyclically and filled with a mixture of a compound causing optical isomerization and a nematic liquid crystal, thereby enabling phase transition between nematic phase and isotropic phase of the liquid crystal by optical isomerization of the compound, and accordingly carrying out ON/OFF switching of the reflectivity by reciprocally radiating ultraviolet rays and visible lights and adjusting the wavelength of the reflection peak dependent on the diameter of the spherical space.

A technique enables obtaining various optical properties by forming three-dimensional periodic structures with different refractive indexes in the thickness direction by forming recessed pores in two-dimensional cycles on a substrate formed by cyclically layering a plurality of media with different refractive indexes and etching properties; filling the pores with a liquid crystal; and making the three-dimensional periodic structure variable.

According to a technique, the non-cyclical property of the refractive index can be changed as desired by changing the size of a substrate by applying an external field such as a magnetic field or an electric field to periodic structures formed by cyclically arranging an optical medium in or on the substrate.

From the viewpoint of improving contrast and the like, display devices are required to show white coloration with high degree of whiteness. However, with respect to the above-mentioned techniques, the optical amount is controlled by changing the cycles of the periodic structures by changing the sizes of the spaces of the periodic structures, of the periodic structures themselves, or of the diameters of the particles composing the periodic structures. Moreover, by changing at least one of specific reflection wavelength and transmission wavelength of visible lights, the displayed colors are changed. Although a plurality of different colors can be exhibited, visible lights in the full range of the wavelength cannot be reflected. In other words, it has been difficult to show white coloration. Therefore, since white color can only be exhibited by combining three primary colors reflected from, for example, three different regions, it has been difficult to achieve high reflectivity, i.e., to show white coloration with high degree of whiteness.

With respect to a method of changing the cycles of periodic structures by filling pores of the periodic structures with a liquid crystal, since the light scattering property by the liquid crystal is low and for the same reasons as described above, it has been difficult to show white coloration with high degree of whiteness.

SUMMARY

The present invention has been made in view of the above circumstances and provides a multicolor display optical composition, an optical device, and a display method of the optical device.

According to an aspect of the invention, a multicolor display optical composition comprises a light transmissive dispersion medium, a periodic structure arranged in the dispersion medium and having a porous structure to communicate between the inside and the outside, and mobile particles contained in the dispersion medium so as to be movable and having a volume average primary particle diameter of 1 nm or larger and 80 nm or smaller in dispersion state in the dispersion medium, a volume average particle diameter of coagulated particles of 100 nm or larger in optical coagulation state by stimulation application, and having a refractive index different from that of the dispersion medium by 0.1 or more.

According to another aspect of the invention, an optical device comprises a pair of substrates and between the substrates being arranged a light transmissive dispersion medium, a periodic structure arranged in the dispersion medium and having a porous structure to communicate between the inside and the outside, and mobile particles contained in the dispersion medium so as to be movable and having a volume average primary particle diameter of 1 nm or larger and 80 nm or smaller in dispersion state in the dispersion medium, a volume average particle diameter of coagulated particles of 100 nm or larger in optical coagulation state by stimulation application, and having a refractive index different from that of the dispersion medium by 0.1 or more.

According to another aspect of the invention, a display method of an optical device comprising: layering the mobile particles at least on the surface of the periodic structures, and the optical device comprises a pair of substrates and between the substrates being arranged a light transmissive dispersion medium, a periodic structure arranged in the dispersion medium and having an porous structure to communicate between the inside and the outside, and mobile particles contained in the dispersion medium so as to be movable and having a volume average primary particle diameter of 1 nm or larger and 80 nm or smaller in dispersion state in the dispersion medium, a volume average particle diameter of coagulated particles of 100 nm or larger in optical coagulation state by stimulation application, and having a refractive index different from that of the dispersion medium by 0.1 or more.

BRIEF DESCRIPTION OF THE DRAWINGS

Preferred embodiments of the present invention will be described in detail based on the following figures, wherein:

FIGS. 3A, 3B, 3C, 3D, and 3E are schematic diagrams illustrating the alteration of the ratios of the mobile particles contained in an porous structure of the periodic structure in the optical device (10) according to the embodiment, and FIG. 3A schematically shows the state that no mobile particle enters in the periodic structure, FIG. 3B schematically shows the state that the mobile particles start entering in the periodic structure, FIG. 3C schematically shows the state that the content of the mobile particles contained in the porous structure of the periodic structure is large as compared with that of the mobile particles shown in FIG. 3B, FIG. 3D schematically shows the state that the content of the mobile particles contained in the porous structure of the periodic structure is large as compared with that of the mobile particles shown in FIG. 3C, and FIG. 3E schematically shows the state that the porous structure of the periodic structure is substantially completely occupied with the mobile particles and the mobile particles are layered while they are coagulated in the surface of the periodic structure;

DETAILED DESCRIPTION

Hereinafter, embodiments of the present invention will be described in detail. In this connection, the same symbols are assigned to the parts having specifically same functions in all of the diagrams and explanations may sometimes be omitted if they are overlapped.

Figure 1:
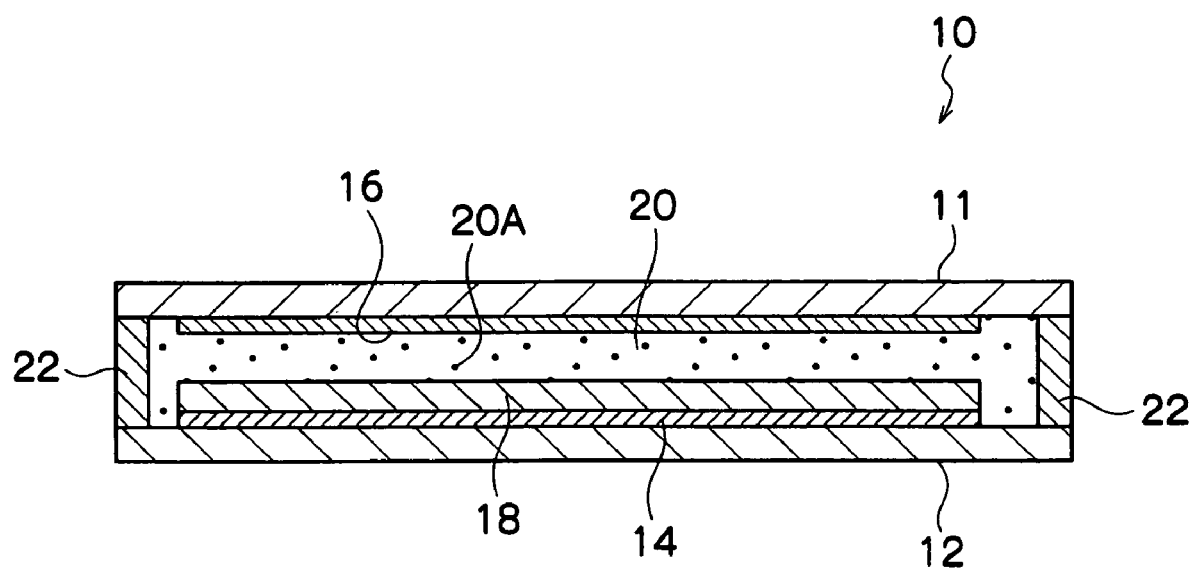
FIG. 1 is a schematic configurational diagram showing an optical device (10) according to an embodiment of the invention.

FIG. 1 is a schematic configurational diagram showing an optical device 10 according to an embodiment of the invention. The optical device 10 according to the embodiment of the invention comprises, as shown in FIG. 1, a transparent substrate 11 and a back substrate 12 disposed oppositely at a predetermined gap by a spacer 22; a first electrode 14 and a second electrode 16 installed in the gap between the transparent substrate 11 and the back substrate 12; and a periodic structures 18 and a dispersion medium 20 as a multicolor display optical composition. Mobile particles 20A are contained in the dispersion medium 20 in a manner that the mobile particles 20A can move by electric field or magnetic field generated in the optical device 10.

The mobile particles 20A, which can move in the optical device 10 in accordance with the electric field or magnetic filed as described above, may be electrically charged mobile particles having predetermined electric charge and magnetic mobile particles having magnetism.

The optical device 10 corresponds to an optical device of the invention. The above-mentioned composition containing the dispersion medium 20, the periodic structure 18, and the mobile particle 20A correspond to a multicolor display optical composition of the invention, the dispersion medium 20 corresponds to the dispersion medium of the invention and the periodic structure 18 corresponds a periodic structure of the invention. Further, the above-mentioned first electrode 14 and the second electrode 16 correspond the layer unit and selective arrangement unit, respectively.

The periodic structure 18 abuts against the first electrode 14 in layer state and arranged together with the first electrode 14 on the back substrate 12. On the other hand, the dispersion medium 20 is enclosed in the gap between the substrates and brought into contact with the periodic structure 18 and also with the second electrode 16 arranged on the surface of the transparent substrate 11.

At first, the periodic structure (18) will be described. A usable structure has a periodic structure in which two or more regions having the sizes of approximately to an extent of light wavelength and different refractive indexes are cyclically arranged approximately in a submicron-scale and, under a certain condition, the usable periodic structure may cause visible light interference and thus exhibit structural color specific to the periodic structure. Of course, it is allowed to compose the periodic structures in a manner that the periodic structure (18) is not colored as the structural color derived from the structure itself, that is it has no structural color in the visible region and the periodic structure (18) alone exhibits the material color and is enabled to show a predetermined structural color by changing the average refractive index by the mobile particles and thereby making the structural color reach the visible light region.

Additionally, the periodic structure (18) optimized for the optical device (10) is also called as a photonic crystal structure.

The definition of the above-mentioned "structural color" is not so definite but means the color-formation phenomenon attributed to the micro-structure of the size of the light wavelength or the shorter wavelength and color-formation due to the wave-like property of the light different from many ordinary coloring materials showing colors.

The color of the material of the periodic structure (18) may be colored or may not be colored. In the case where the structural color of the periodic structure (18) exhibits no coloration or the structural color becomes colorless (i.e. out of the visual region light) attributed to the alteration of the average refractive index by mobile particles as described later, the color of the material of the periodic structure (18) (hereinafter, referred to as material color) can be displayed.

For example, if the material color of the periodic structure (18) is black (colored), the optical device (10) can show black coloration when the structural color is out of the visible light region. On the other hand, if the material color of the periodic structure (18) is transparent (colorless), the optical device (10) can allow the light to transmit therethrough when the structural color is out of the visible light region.

It is required for the periodic structure (18) to have a porous structure communicated with the inside and the outside so as to lead the mobile particles (20A) in and out and for example, a porous structure can be exemplified as such a porous structure.

The porous structure comprises of pores with cubic, spherical or other forms and the pores are preferable to be continuous from the back substrate (12) to the transparent substrate (11) of the periodic structure (18) in inverse directions.

Specific examples of the periodic structure (18) may include positive working structures such as a colloidal crystal structure, a micro-domain structure, and a lamellar structure and negative working structures obtaining by using these positive working structures as dies.

A positive working structure is a structure provided with pores among the unit structures (e.g. particles) to form a porous structure. On the other hand, the negative working structure is formed by filling the pores among the unit structures (e.g. particles) with an object substance forming a template and then removing the structures.

In the periodic structure (18), mobile particles (20A) come in or come out of the porous structure of the periodic structure (18), so that the structural color derived from the periodic structure (18) can be changed. In other words, the periodic structure (18) is able to change its structural color derived from the periodic structure (18) according to the change of the content of the mobile particles in the porous structure of the periodic structure (18) in view of the all pores.

As details will be described, the mobile particles (20A) to be employed in the invention show no coloration in the state where being dispersed in the dispersion medium (20) and show white coloration with a predetermined whiteness value in the coagulated state.

Therefore, in the case where the mobile particles (20A) to be used in the invention are layered in the coagulated state (that is, forming coagulated particles) on the surface of the periodic structure (18), the optical device (10) can exhibit the white color with high whiteness by light scattering by the mobile particles (20A) (details will be described later).

The above-mentioned "content" shows the ratio of the mobile particles (20A) existing in the porous structure per unit volume in the porous structure of the periodic structure (18).

Herein, to arrange the mobile particles (20A) selectively in the inside or the outside of the porous structure of the periodic structure (18), it is required for the mobile particles (20A) to easily come in or come out of the porous structure. Therefore, the porous structure (including the communication paths for communicating with the outside) has to have a predetermined size or larger.

It is also essential that the wavelength of the light reflected by the periodic structure (18) be within a visible light range to show the structural color of the periodic structure (18).

The longer diameter of the pores composing the porous structure is required to be within a range of 10 nm or longer and 1,000 nm or shorter. If the longer diameter of the pores forming the porous structure is shorter than 10 nm or longer than 1,000 nm, the wavelength of the reflected light of the periodic structure (18) is considerably out of the visible light range that the color change obtained by the function of the mobile particles is adversely limited.

Further, it is needed that the communication paths (pores) exist among the above-mentioned pores or to the outside and with respect to the diameter of the pores, the longer diameter is desirable to be 1 nm or longer and 1,000 nm or shorter. If it is smaller than 1 nm, the movement of the mobile particles in the periodic structure (18) is suppressed and if it is larger than 1,000 nm, there occurs a problem that the strength of the periodic structure (18) is lowered.

Additionally, the principle of the color modulating of the optical device (10) in the invention is based on that the refractive index of the periodic structure (18) is changed by changing the content of the mobile particles (20A) to be moved to the inside of the periodic structure (18) and accordingly the color (wavelength) is changed. However, since the changeable value the refractive index is limited, in other words, the range of wavelength to be changed is limited. Therefore, if the reflected wavelength in the state (the initial state) where no mobile particle (20A) is contained in the periodic structure (18) is too short or too long, it becomes difficult to change the wavelength in the entire visible light range. Accordingly, it is needed to set the reflected wavelength in the initial state to be as near as possible to the border of the visible light range.

The reflected light wavelength in the initial state is determined in accordance with the diameter of the pores of the periodic structure (18) and the refractive index. Since the effect of the diameter is particularly significant, it is required to limit it as described above. As the longer diameter of the pores becomes smaller, the reflected light wavelength of the periodic structure (18) in the initial state is shifted to the shorter wavelength (ultraviolet region) side and as the larger diameter of the pores becomes lager, the reflected light wavelength of the periodic structure (18) is shifted to the longer wavelength (near infrared region) side and both cases, it becomes colorless for the human eyes.

The periodic structure (18) may be insulated or conductive, however in the case where it also works as an electrode, at least the surface has to have conductivity. In this connection, since the negative working structure itself generally has no conductivity, a negative working structure obtained by coating the surfaces of these structures with a conductive substance and a negative working structure (so-called a hollow structure) obtained by filling spaces among the unit structures (e.g. particles) with a conductive substance and removing these structures may be employed.

The colloidal crystal structure may include a non-most densely packed type structure in which colloid particles are packed by utilizing the repellent power and a most densely packed type structure in which the colloid particles are packed densely. The colloid particles are particles having a volume average particle diameter of 10 nm to 1,000 nm and may include silica particles and polymer particles (e.g. polystyrene, polyesters, polyimides, polyolefins, poly(methyl (meth)acrylate), polyethylene, polypropylene, polyethylene, polyether sulfones, nylon, polyurethanes, poly(vinyl chloride), and poly(vinylidene chloride), as well as inorganic particles of titanium oxide or the like.

These colloid particles may be produced by, for example, emulsion polymerization, suspension polymerization, two-step template polymerization, a chemical vapor reaction method, electric furnace heating method, a thermal plasma method, a laser heating method, an evaporation-in-gas method, a co-precipitation method, a uniform precipitation method, a compound precipitation method, a metal alkoxide method, a hydrothermal synthesis method, a sol-gel method, a spraying method, a refrigerating and freezing method, and a nitrate decomposition method. Further, the colloidal crystal structure may be formed by a method of depositing the colloid particles on a substrate by gravitation precipitation or coating and drying in self-alignment manner; or depositing the colloid particles by effect of an electric field or a magnetic field; or depositing the colloid particles on a substrate by immersing the substrate in a dispersion medium containing the colloid particles and pulling out the substrate.

The colloidal crystal structure is preferable to have a thickness of 100 nm to 5 mm and preferably 500 nm to 1 mm.

The micro-domain structure has a periodic structure of several nano-meter to sub-micrometer owing to the repellency among different types of polymers by utilizing a blend of different type polymers comprising two or more components or a block copolymer formed by chemically bonding different types of polymers. The polymer blend may be various combinations of existing various kinds of polymers and block copolymer may be poly(styrene-co-isoprene) block copolymer, poly(styrene-co-butadiene) block copolymer, poly(styrene-co-vinylpyridine) block copolymer, and poly (styrene-co-ethylene-propylene) block copolymer and the polymers may comprise a plurality of the repeating units.

The micro-domain structure is produced by heating a polymer blend to a fluidization temperature or higher and then solidifying the blend by cooling or dissolving the polymer blend in a solvent and then solidifying the blend by evaporating the solvent.

The micro-domain structure is preferable to have a refractive index difference among respective domains in a range of 0.1 to 10 and the characteristic distance of the domains in a range of 10 nm to 1000 nm.

The lamellar structure is one of liquid crystal structures in which molecular membranes are stacked in layers and stabilized by mutual repellent power. Materials, which form the molecular membranes, may be surfactants and the like.

The lamellar structure can be produced by sol-gel synthesis of alkoxysilanes in a gap between neighboring lamellar layers of a multilayered bimolecular membrane of a surfactant as a reaction field. This technique may be employed for obtaining the periodic structure by utilizing hexagonal phase or inversely hexagonal phase formed by a surfactant as a reaction field.

The lamellar structure is preferable to have a refractive index difference among respective domains in a range of 0.1 to 10 and the characteristic interlayer distance in a range of 10 nm to 1000 nm.

The periodic structure can be obtained by layering materials with different refractive indexes by a thin film formation method such as an evaporation method, a sputtering method, a coating method, a pulling method and the like.

The porous structure having a periodic structure can be produced by removing some of components from the micro-domain or lamellar structure having the periodic structure produced in the above-mentioned manner.

As the object substance forming the template for producing the negative working structure as the periodic structure (18) are employed thermosetting resins, UV-setting resins, electron beam-setting resins, polyesters, polyimides, acrylic resins such as poly(methyl methacrylate), polystyrenes and their derivatives, polyethylene, polypropylene, polyamides, poly (vinyl chloride), poly(vinylidene chloride), polycarbonates, polyether sulfones, cellulose derivatives, fluoro-containing resins, silicone type resins, epoxy type resins, polyacetal type resins, sol-gel materials, silica, ceramics, and metal oxides. As the conductive substance for obtaining a conductive periodic structure (18) are employed carbon materials, metals (e.g. copper. aluminum, silver, gold, nickel, platinum, and the like), metal oxides (e.g. tin oxide, and tin oxide-indium oxide (ITO)), conductive polymers (e.g. polypyrroles, polythiophenes, polyanilines, polyphenylene vinylenes, polyacenes, and polyacetylenes).

In the case where a polymer is employed for the object substance forming a template (including a conductive substance) for composing the negative working structure (the hollow structure) as the periodic structure (18), the optical device (10) is provided with a flexible property (flexibility and bending property).

In the case where a positive working structure of the periodic structure (18) is provided with conductivity, the surface of the above-mentioned colloidal crystal structure, micro-domain structure, and lamellar structure is coated with a conductive substance by plating or electrolytic polymerization. It is also possible to carry out coating with a conductive substance precursor and successively carrying out treatment of calcination or the like to give the conductive substance.

The negative working structure (a hollow structure) of the periodic structures (18) can be produced by filling the pores of the above-mentioned colloidal crystal structure, a micro-domain structure, and a lamellar structure with the above-mentioned object substance forming a template (including the conductive substance) by polymerization of monomers, metal plating, sol-gel reaction, and electrolytic polymerization and then removing the positive working structure. It is also possible to apply or pack a precursor of the object substance forming a template (including the conductive substance) and successively carry out a treatment such as calcination to give the object substance forming a template (including the conductive substance).

Figure 2C:
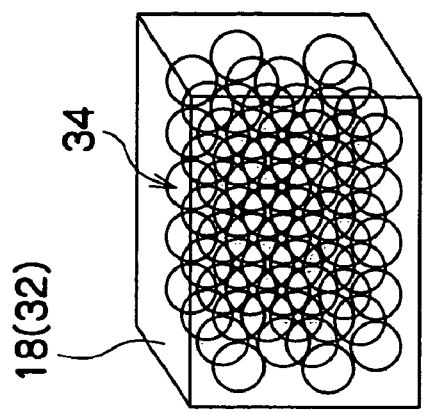
FIGS. 2A, 2B, and 2C are schematic diagrams illustrating a production example of a periodic structure in the optical device (10) according to the embodiment.
Figure 2B:
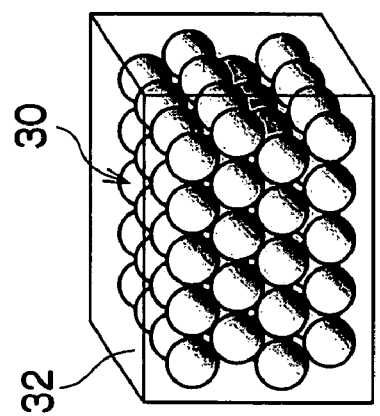
Figure 2A:
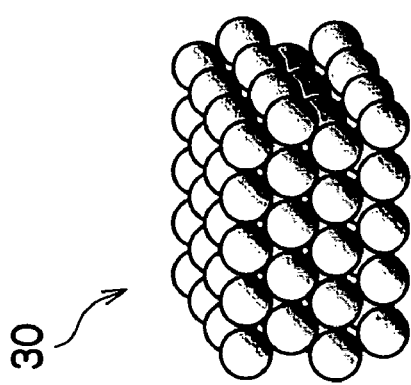

Specifically, as shown in FIG. 2, a colloidal crystal structure 30 of silica particles is formed (FIG. 2A) and then a conductive substance precursor such as a furfuryl alcohol resin is applied to the surface or packed in the pores (interparticle pores) of the colloidal crystal structure 30 and calcinated to consequently apply or pack hardly graphitize-able carbon as a conductive substance 32 (FIG. 2B). Thereafter, the colloidal crystal structure 30 is removed by etching with hydrofluoric acid or the like to form the pores 34 with the same shape as the colloidal crystal structure 30 (FIG. 2C). In such a manner, the negative working structure 18 made of the conductive substance 32 can be formed.

Further, the periodic structure (18) may be a group of powders produced by crushing the above-mentioned negative working structure (the hollow structure). The visible light-interfering function of the periodic structure itself is made to be random by crushing the negative working structure and accordingly, the visible field angle-dependency of the structural color due to the periodic structure can be improved. The crushing extent of the negative working structure is from the extent that the structural color derived from the periodic structure does not disappear, that is the extent that the periodic structure is not broken to an extent that the a predetermined gaps are kept among powders (the porous structure is kept). Specifically, crushing may be carried out to control a number average particle diameter in a range from 100 nm to 5 mm (as the characteristic value expressing the size of the powders).

The material composing the periodic structure (18) is preferable to have a refractive index in a range from 1.3 to 4.0; more preferable in a range from 1.4 to 3.0 in terms of the range of the modulation width of the structural color.

Specifically, the difference of the refractive index between the periodic structure (18) and the dispersion medium (20) is preferably about 0 to 4.0. The respective refractive indexes can be measured by an Abbe's refractometer.

Fractionation of the periodic structure (18) can be carried out in every one pixel of 10 μm to 5 mm square. The thickness of the periodic structure (18) is preferable to be 500 nm to 5 mm.

Next, the mobile particles (20A) will be described.

The mobile particles (20A) are particles movable in the dispersion medium (20) by an effect of an electric field or a magnetic field. The mobile particles (20A) enter in the porous structure of the periodic structure (18) to change the average refractive index in the periodic structure (18) and accordingly change the structural color of the periodic structure (18).

The mobile particles (20A) to be used in the invention show no coloration in the dispersion state that they are dispersed in the dispersion medium (20) and show white coloration with whiteness of a predetermined level or higher in coagulated state.

Therefore, in the case where the mobile particles (20A) to be employed in the invention are layered and coagulated (that is, form coagulated particles) on the surface of the periodic structure (18), the optical device (10) exhibits white color with high whiteness by light scattering by the mobile particles (20A).

In this connection, "optically coagulated state" means the state that the distance among the mobile particles (20A) is ½λ of the wavelength of light or shorter.

Specific examples of the mobile particles (20A) are preferably colorless inorganic particles of silica, titanium oxide, tin oxide, zinc oxide, calcium carbonate, barium carbonate, zirconium oxide, barium sulfide, and zinc sulfide; polymer particles in which these particles are dispersed; and colorless polymer particles and additionally, metal nano-particles of gold and silver and other metal oxide particles are also included in the examples.

Further, so-called electrophoretic particles moving in a liquid by an effect of an electric filed are even more preferable for the mobile particles. Besides utilization of the characteristic electric chargeability of particles, the electrophoretic property can be provided by binding, adsorbing, or coating an electrically chargeable substance to, in, or on the surface of particles. For example, a method of adsorbing a low molecular weight compound having an acidic group, an amino group, or an ammonium group and a surfactant and a method of applying or grafting a polymer having these functional groups may be employed.

The volume average primary particle diameter of the mobile particles (20A) in the dispersion state that the particles are dispersed in a dispersion medium (20) is preferably in a range from 1 nm to 80 μm, more preferably in a range from 1.0 μm to 50 nm, and even more preferably in a range from 1.0 nm to 40 nm.

If the volume average primary particle diameter in the dispersion state of the particles dispersed in the dispersion medium (20) is smaller than 1 nm, there occurs a problem that the optical coagulation state is hardly formed by applying stimulation and if it is larger than 80 nm, there occurs a problem that the transparency of the particle dispersion medium is decreased by the light scattering property.

The refractive index of the mobile particles (20A) is preferably in a range from 0.01 to 3, more preferably in a range from 0.1 to 3, and even more preferably in a range from 0.1 to 2.5 in terms of the range of the modulation width of the structural color.

In the case where the refractive index is lower than 0.01 or the refractive index is higher than 3, the materials are limited and there occurs a problem that the option is narrowed.

On the other hand, the volume average primary particle diameter of coagulated particles of mobile particles (20A) in the coagulation state that the mobile particles are coagulated in a dispersion medium (20) is preferably 100 nm or larger, more preferably in a range from 100 nm to 10 μm, and even more preferably in a range from 100 nm to 1 μm.

If the volume average primary particle diameter of the coagulated particles of the mobile particles (20A) is smaller than 100 nm, there occurs a problem that the light scattering is decreased and accordingly the whiteness is decreased and if it is larger than 10 μm, there may occur a similar problem that the whiteness may be decreased.

The refractive index of the coagulated particles of the mobile particles (20A) is essentially needed to be different from the refractive index of the dispersion medium (20) by 0.1 or more, preferably 0.15 or more, and further preferably 0.2 or more.

If the refractive index of the coagulated particles of the mobile particles (20A) is same as the refractive index of the dispersion medium (20), there occurs a problem that the whiteness becomes low.

The mobile particles (20A) to be used in the invention are so constituted as described above that they can show colorless in the dispersion state in the dispersion medium (20) and show white coloration with whiteness of a predetermined value or higher in the coagulation state that they are coagulated.

The whiteness means ISO whiteness.

The above-mentioned "whiteness of a predetermined value" is preferably 20% or higher whiteness, more preferably 30% or higher whiteness, and even more preferably 40% or higher whiteness.

The whiteness is determined according to the constitution of the mobile particles (20A) and the volume average primary particle diameter of the coagulated particles.

As the measurement method of the volume average particle diameter is employed a laser diffraction scattering method carried out by radiating laser beam to a group of particles and measuring the average particle diameter from the intensity distribution pattern of the diffracted and scattered lights emitted from the particles The laser diffraction scattering method is carried out at 25° C. by using a dynamic light scattering type particle diameter distribution measurement apparatus (LB-550, manufactured by Horiba Ltd.). In the case of metal nano-particles, the measurement is carried out by using a transmission electron microscope (HD-2300, manufactured by Hitachi High Technologies, Inc.).

The ISO whiteness is measured in accordance with JIS P 8148, the disclosure of which is incorporated by reference herein, by employing an ISO whiteness measurement meter (TB-1) made of Matsubo Co., Ltd.

The concentration (by weight) of the mobile particles (20A) changes in accordance with the porous structure of the periodic structure (18) and it is preferably 0.01 to 70 to the dispersion medium (20), more preferably 0.05 to 50, and even more preferably 0.1 to 20. If the concentration of the mobile particles (20A) is too low, they do scarcely contribute to the structural color change of the periodic structure (18) in some cases and if it is too high, some of the mobile particles cannot enter in the porous structure of the periodic structure (18).

In the embodiment, although the case the particles movable in an electric field are used as the mobile particles (20A) is exemplified for the explanation, the mobile particles may be magnetically mobile particles movable by the effect of magnetism (by magnetic-phoresis).

Examples of the mobile particles are of iron oxides such as magnetite, maghemite, and ferrite and iron oxides containing other metal oxides; metals such as Fe, Co, and Ni, and alloys of these metals with metals such as Al, Co, Cu, Pb, Mg, Ni, Sn, Zn, Sb, Be, Bi, Cd, Ca, Mn, Se, Ti, W, and V; and their mixtures. Specific examples are particles of triiron tetraoxide ($Fe_3O_4$), ferric oxide ($\gamma$-$Fe_2O_3$), iron zinc oxide ($ZnFe_2O_4$), iron yttrium oxide ($Y_3Fe_5O_{12}$), cadmium iron oxide ($CdFe_2O_4$), gadolinium iron oxide ($Gd_3Fe_5O_{12}$), copper ion oxide ($CuFe_2O_4$), iron lead oxide ($PbFe_{12}O_{19}$), iron nickel oxide ($NiFe_2O_4$), iron neodymium oxide ($NdFe_2O_3$), barium iron oxide ($BaFe_{12}O_{19}$), iron magnesium oxide ($MgFe_2O_4$), iron manganese oxide ($MnFe_2O_4$), iron lanthanum oxide (LaFeO₃), iron powder (Fe), cobalt powder (Co), nickel powder (Ni) and polymer particles containing these magnetic materials.

The magnetic mobile particles may be modified with functional groups in the surface to obtain preferable properties. Further, the particles may be modified with a surfactant in the surface by adsorption of the surfactant. The functional groups for modifying the surface may be amino group, ammonium, halogen, hydroxyl, carboxyl, sulfonic acid group, phosphoric acid group, amido group, and thiol. Further, a core-shell structure may be formed using another material.

In the case where magnetic mobile particles are employed for the mobile particles, as the selective arrangement unit may be employed magnetism generating unit (e.g. an electromagnet, a ferrite magnet, a neodymium magnet, a Sm—Co magnet, an Al—Ni—Co magnet, a rubber magnet, and a cap magnet).

Next the dispersion medium (20) will be described.

The dispersion medium (20) is a medium for dispersing the mobile particles (20A), essentially having light transmittance and preferably being colorless and transparent.

Examples of the dispersion medium (20) may include water; organic solvents (e.g. alcohols such as methyl alcohol, ethyl alcohol, propyl alcohol, butyl alcohol, ethylene glycol, and propylene glycol; ketones such as acetone and methyl ethyl ketone; ethers; esters; and others such as dimethylformamide, dimethylacetamide, dimethyl sulfoxide, acetonitrile, ethylene carbonate, propylene carbonate, tetrahydrofuran, pyrrolidone derivatives); high boiling point petroleum fractions such as Isopar and oils (e.g. aliphatic or aromatic organic solvents, silicone oils); ionic liquids (e.g. 1-ethyl-3-methylimidazolium bromide, 1-ethyl-3-methylimidazolium chloride, 1-ethyl-3-methylimidazolium lactate, 1-ethyl-3-methylimidazolium hexafluorophosphate, 1-ethyl-3-methylimidazolium bromide tetrafluoroborate, 1-ethyl-3-methylimidazolium trifluoromethane sulfonate, 1-butyl-3-methylimidazolium bromide, 1-butyl-3-methylimidazolium chloride, 1-butyl-3-methylimidazolium hexafluorophosphate, 1-butyl-3-methylimidazolium tetrafluoroborate, 1-butyl-3-methylimidazolium trifluoromethanesulfonate, 1-butyl-3-methylimidazolium lactate, 1-hexyl-3-methylimidazolium bromide, 1-hexyl-3-methylimidazolium chloride, 1-hexyl-3-methylimidazolium lactate, 1-hexyl-3-methylimidazolium hexafluorophosphate, 1-hexyl-3-methylimidazolium bromide tetrafluoroborate, 1-ethyl-3-methylimidazolium trifluoromethanesulfonate, 1-octyl-3-methylimidazolium bromide, 1-octyl-3-methylimidazolium chloride, 1-octyl-3-methylimidazolium lactate, 1-octyl-3-methylimidazolium hexafluorophosphate, 1-octyl-3-methylimidazolium bromide tetrafluoroborate, 1-octyl-3-methylimidazolium trifluoromethanesulfonate, 1-decyl-3-methylimidazolium bromide, 1-decyl-3-methylimidazolium chloride, 1-decyl-3-methylimidazolium lactate, 1-decyl-3-methylimidazolium hexafluorophosphate, 1-decyl-3-methylimidazolium bromide tetrafluoroborate, 1-decyl-3-methylimidazolium trifluoromethanesulfonate, 1-dodecyl-3-methylimidazolium bromide, 1-dodecyl-3-methylimidazolium chloride, 1-dodecyl-3-methylimidazolium lactate, 1-dodecyl-3-methylimidazolium hexafluorophosphate, 1-dodecyl-3-methylimidazolium bromide tetrafluoroborate, 1-dodecyl-3-methylimidazolium trifluoromethanesulfonate, 1-ethyl-2,3-dimethylimidazolium bromide, 1-ethyl-2,3-dimethylimidazolium chloride, 1-ethyl-2,3-dimethylimidazolium lactate, 1-ethyl-2,3-dimethylimidazolium hexafluorophosphate, 1-ethyl-2,3-dimethylimidazolium bromide tetrafluoroborate, 1-ethyl-2,3-dimethylimidazolium trifluoromethanesulfonate, 1-buyl-2,3-dimethylimidazolium bromide, 1-butyl-2,3-dimethylimidazolium chloride, 1-butyl-2,3-dimettylimidazolium hexafluorophosphate, 1-butyl-2,3-dimethylimidazolium tetrafluoroborate, 1-butyl-2,3-dimethylimidazolium trifluoromethanesulfonate, 1-butyl-2,3-dimethylimidazolium lactate, 1-hexyl-2,3-dimethylimidazolium bromide, 1-hexyl-2,3-dimethylimidazolium chloride, 1-hexyl-2,3-dimethylimidazolium lactate, 1-hexyl-2,3-dimethylimidazolium hexafluorophosphate, 1-hexyl-2,3-dimethylimidazolium bromide tetrafluoroborate, 1-hexyl-2,3-dimethylimidazolium trifluoromethanesulfonate, 1-octyl-2,3-dimethylimidazolium bromide, 1-octyl-2,3-dimethylimidazolium chloride, 1-octyl-2,3-dimethylimidazolium lactate, 1-octyl-2,3-dimethylimidazolium hexafluorophosphate, 1-octyl-2,3-dimethylimidazolium bromide tetrafluoroborate, 1-octyl-2,3-dimethylimidazolium trifluoromethanesulfonate, 1-decyl-2,3-dimethylimidazolium bromide, 1-decyl-2,3-dimethylimidazolium chloride, 1-decyl-2,3-dimethylimidazolium lactate, 1-decyl-2,3-dimethylimidazolium hexafluorophosphate, 1-decyl-2,3-dimethylimidazolium bromide tetrafluoroborate, 1-decyl-2,3-dimethylimidazolium trifluoromethanesulfonate, 1-dodecyl-2,3-dimethylimidazolium bromide, 1-dodecyl-2,3-dimethylimidazolium chloride, 1-dodecyl-2,3-dimethylimidazolium lactate, 1-dodecyl-2,3-dimethylimidazolium hexafluorophosphate; 1-dodecyl-2,3-dimethylimidazolium bromide tetrafluoroborate, 1-dodecyl-2,3-dimethylimidazolium trifluoromethanesulfonate, 1-ethylpyridium bromide, 1-ethylpyridium chloride, 1-ethylpyridium lactate, 1-ethylpyridium hexafluorophosphate, 1-ethylpyridium tetrafluoroborate, 1-ethylpyridium trifluoromethanesulfonate, 1-butylpyridium bromide, 1-butylpyridium chloride, 1-butylpyridium lactate, 1-butylpyridium hexafluorophosphate, 1-butylpyridium tetrafluoroborate, 1-butylpyridium trifluoromethanesulfonate, 1-hexylpyridium bromide, 1-hexylpyridium chloride, 1-hexylpyridium lactate, 1-hexylpyridium hexafluorophosphate, 1-hexylpyridium tetrafluoroborate, and 1-hexylpyridium trifluoromethanesulfonate). Particularly, it is preferable to use an ionic liquid as the solvent of the dispersion medium (20). Since the ionic liquid has particularly low volatile property as compared with other solvents, the device can be stable for a long duration.

The refractive index of the dispersion medium (20) is essential to be different from that of the mobile particles (20A) and is preferably in a range from 1.3 to 2, more preferably in a range from 1.33 to 1.9, and even more preferably in a range from 1.33 to 1.8.

If the refractive index of the dispersion medium (20) is lower than 1.3 or higher than 2, there occurs a problem for the liquid material that the option of the material selectivity is narrowed.

The refractive index may be measured by a general refractometer.

From a viewpoint of the moving speed of the mobile particles (20A), the viscosity of the dispersion medium (20) is preferably in a range from 0.1 mPa.s to 1 Pa.s, more preferably in a range from 0.5 mPa.s to 500 mPa.s, and even more preferably in a range from 1 mPa.s to 100 mPa.s.

If the viscosity of the dispersion medium (20) is lower than 0.1 mPa.s, there may occur a problem that the option of the material selectivity is narrowed and if viscosity of the dispersion medium (20) is higher than 1 Pa.s, there may occur a problem that the moving speed is lowered.

Herein, the viscosity is the value at 25° C.

From a viewpoint of the moving speed by an electric field, the relative dielectric constant of the dispersion medium (20) is preferably in a range from 1.0 to 100, more preferably in a range from 2 to 50, and even more preferably in a range from 3 to 20.

If the relative dielectric constant of the dispersion medium (20) is lower than 1, there may occur a problem that the moving speed of the movable dispersion medium (20A) is lowered and if it is higher than 100, there may occur a problem that the option of the material selectivity is narrowed.

Next, the electrode will be described. The material composing the first electrode (14) and the second electrode (16) as layering unit, selective arrangement unit, and electric field application unit in the optical device and multicolor display composition of the invention may be preferably electrodes made of carbon materials, metals (e.g. copper. aluminum, silver, gold, nickel, platinum, and the like), metal oxides (e.g. tin oxide, and tin oxide-indium oxide (ITO)), conductive polymers (e.g. polypyrroles, polythiophenes, polyanilines, polyphenylene vinylenes, polyacenes, and polyacetylenes), and composite materials of these conductive polymers and particles of the above-mentioned metals and metal oxides.

The selective arrangement unit (the electric field application unit and the layering unit) is not limited to the electrode but any made of a conductive material and examples usable as the material are metals such as titanium, vanadium, chromium, manganese, iron, cobalt, nickel, copper, zinc, gallium, germanium, silver, cadmium, and indium; conductive polymers such as polyacetylene, poly(p-phenylene), polymethyl thiophene, polypyrrole, polyaniline, and polyphenylene vinylene; and resins provided with conductivity by kneading metals particles or carbon particles in polymer matrix and carbon materials.

Materials usable for composing the transparent substrate (11) and the back substrate (12) are films and plate-like substrates of polyesters, polyimides, polyolefins, acrylic resins such as poly(methyl(meth)acrylate); polystyrenes, polyethylenes, polypropylenes, polyethylenes, polyether sulfones, nylon, polyurethanes, poly(vinyl chloride), and poly(vinylidene chloride); glass substrates, metals, metal films, and ceramics. Particularly in the case where a film substrate having a bending property is used as the transparent substrate (11) and the back substrate (12), the device to be obtained is provided with a flexible property (the flexibility and bending property).

The back substrate (12) may be colored or contain a colored body (e.g. a colored film is stuck to the substrate surface). For example, in the case where the color of a material for the periodic structure (18) is transparent (colorless), the periodic structure (18) transmits the light when the structural color is gone out of the visible light region and the color of the back substrate (12) or the color of the colored body can be exhibited as the color of the optical device (10). Accordingly, if the back substrate (12) is made to be black or the colored body is made to be black, black color, which is difficult to be exhibited only by the structural color of the periodic structure (18), can be displayed. In the embodiment, the colored body can work as the first electrode (14).

The spacer (22) is made of a resin, a metal oxide, or glass. The spacer (22) is not particularly limited, however it is arranged so as to keep a sufficiently even gap between the substrates for reliable arrangement of an electric insulating liquid, the periodic structure (18), and the dispersion medium (20).

The shape of the spacer (22) is not particularly limited if it can stably keep the gap and for example, those having a spherical, cubic, or column-like independent shape are preferably used.

Additionally, besides the above-mentioned constituent elements, the optical device (10) according to the embodiment may comprise a surface protection layer, a color filter layer, a UV absorption layer, a reflection prevention layer, a wiring, an electric circuit, IC, LSI, and an electric power source.

With respect to the respective constituent elements, materials, which are not decomposed or inactive materials at the voltage for applying the electric field, are preferably used for composing them.

A display method of the optical device (10) according to the embodiment with the above-mentioned constitution will be described.

The display method of the optical device (10) is capable of exhibiting white color with a high ISO whiteness by changing the structural color in accordance to the content of the mobile particles (20A) in the porous structure of the periodic structure (18) and coagulating the mobile particles (20A) on the surface of the periodic structure (18) by layering the mobile particles (20A) of the surface of the periodic structure (18).

In the optical device (10) of the invention, to show white coloration with ISO whiteness of a predetermined value or higher, the following two methods can be exemplified as the display method of the optical device (10) of the invention.

At first, in a first method, the amount of the mobile particles (20A) to be contained in the dispersion medium (20) is adjusted so as to increase the total volume of the mobile particles (20A) contained in a single optical device (10) more than the total volume of the porous structure of the periodic structure (18) (hereinafter, referred to as porous structure in some cases).

In this method, the mobile particles (20A) are moved toward the periodic structure (18) in the dispersion medium (20) and the porous structure of the periodic structure (18) is substantially occupied with the mobile particles (20A) and therefore, the mobile particles (20A) which cannot enter the porous structure are layered on the surface of the periodic structure (18), so that the white color with a predetermined whiteness can be exhibited.

The state where that the mobile particles (20A) are layered on the surface of the periodic structure (18) means the optical coagulation state that the mobile particles (20A) are coagulated on the surface of the periodic structure (18) and if the mobile particles (20A) are layered on the surface of the periodic structure (18), it is enabled to show white coloration with the above-mentioned predetermined whiteness.

In the second method, an electric field or a magnetic field is generated in the optical device (10) so as to move the mobile particles (20A) dispersed in the dispersion medium (20) at a predetermined standard mobility or higher in the dispersion medium (20).

In this method, the effect among the mobile particles (20A) arriving at the surface of the periodic structure (18) is strengthened to layer (that is, coagulate) them on the surface of the periodic structure (18) and accordingly show white coloration with a predetermined whiteness or higher.

The above-mentioned mobility shows the distance movable for the mobile particles (20A) in the dispersion medium

(20) per unit time. That is, the mobility means the average moving speed of the mobile particles (20A) per unit electric field.

The above-mentioned "standard mobility" is determined in accordance with the volume average primary particle diameter of the mobile particles (20A), charge amount of the mobile particles (20A), the viscosity and dielectric constant of the dispersion medium (20), and the length of the shorter side of the porous structure of the periodic structure (18) and the standard mobility as the moving speed of the mobile particles (20A) moving from the transparent substrate (11) side to the back substrate (12) side should be determined to be higher than the moving speed of the mobile particles (20A) in the porous structure of the periodic structure (18).

At first, the first method will be described in detail.

In the state where no voltage is applied to the first electrode 14 and the second electrode 16 as electric field application unit and as shown in FIG. 3A, the mobile particles 20A are substantially all dispersed in the dispersion medium 20, no mobile particle 20A moves to the porous structure of the periodic structure 18 and therefore, the reflected light of the periodic structure 18 is out of the visible light region (since the refractive index of the material composing the periodic structure 18 is out of the visible light region).

Therefore, as shown in FIG. 3A, in the state where substantially all of the mobile particles 20A are dispersed in the dispersion medium 20, when being seen from the transparent substrate 11 side, the structural color (reflected light with wavelength out of the visible right region, e.g. black color) of the periodic structure 18 is exhibited as the color of the optical device 10.

When the voltage is applied to the first electrode 14 and the second electrode 16 to start electric field generation in the optical device 10 for moving the mobile particles 20A in the first electrode 14 side formed in the back substrate 12 side in the dispersion medium 20 at the mobility lower than the above-mentioned standard mobility, as shown in FIG. 3B, the mobile particles 20A enter the porous structure 18A of the periodic structure 18.

Once the mobile particles 20A start entering the porous structure from the state that all of the mobile particles 20A are dispersed in the dispersion medium 20 and no mobile particle 20A enters the porous structure 18A, the wavelength of the reflected light of the periodic structure 18 is shifted to the visible light region and the optical device 10 exhibits blue color (reference to FIG. 3B).

When the voltage application to the first electrode 14 and the second electrode 16 is continued, the entering of the mobile particles 20A in the porous structure proceeds and when the content of the mobile particles 20A in the porous structure is increased as compared with the state shown in FIG. 3B (reference to FIG. 3C), the reflected light of the periodic structure 18 is changed to be green from blue.

Figure 4A:
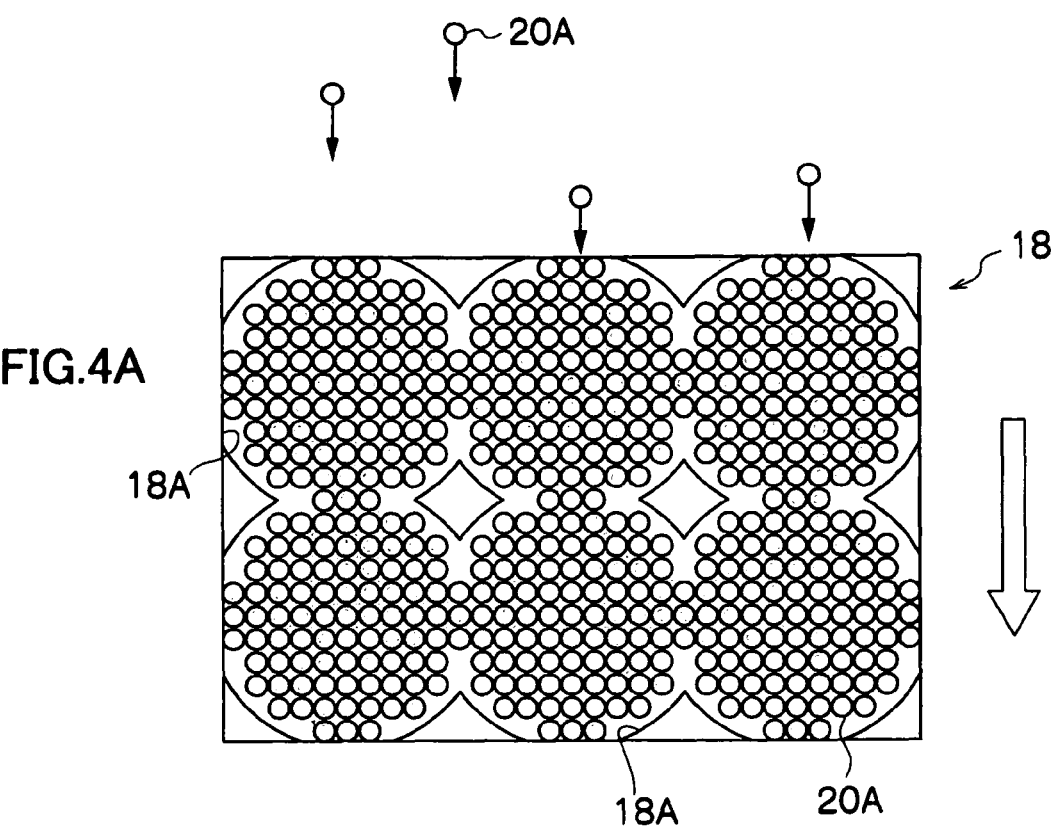
FIGS. 4A and 4B are schematic diagrams illustrating the state that the mobile particles enter in the porous structure of the periodic structure in the optical device (10) according to the embodiment, and FIG. 4A schematically shows the state that mobile particles enter in the porous structure and FIG. 4B schematically shows the state that the mobile particles come out of the porous structure.

When the voltage application to the first electrode 14 and the second electrode 16 is continued, the entering of the mobile particles 20A in the porous structure proceeds and when the content of the mobile particles 20A in the porous structure is increased as compared with the state shown in FIG. 3C (reference to FIG. 3D and FIG. 4A), the reflected light of the periodic structure 18 is changed to be red from green.

When the occupying ratio of the mobile particles 20A in the porous structure of the periodic structure 18 reaches substantially 100%, as shown in FIG. 3E, the mobile particles 20A are coagulated and layered on the surface of the periodic structure 18. When the mobile particles 20A are layered on the surface of the periodic structure 18, white color with a high whiteness can be exhibited by light scattering by the coagulation of the mobile particles 20A.

Figure 4B:
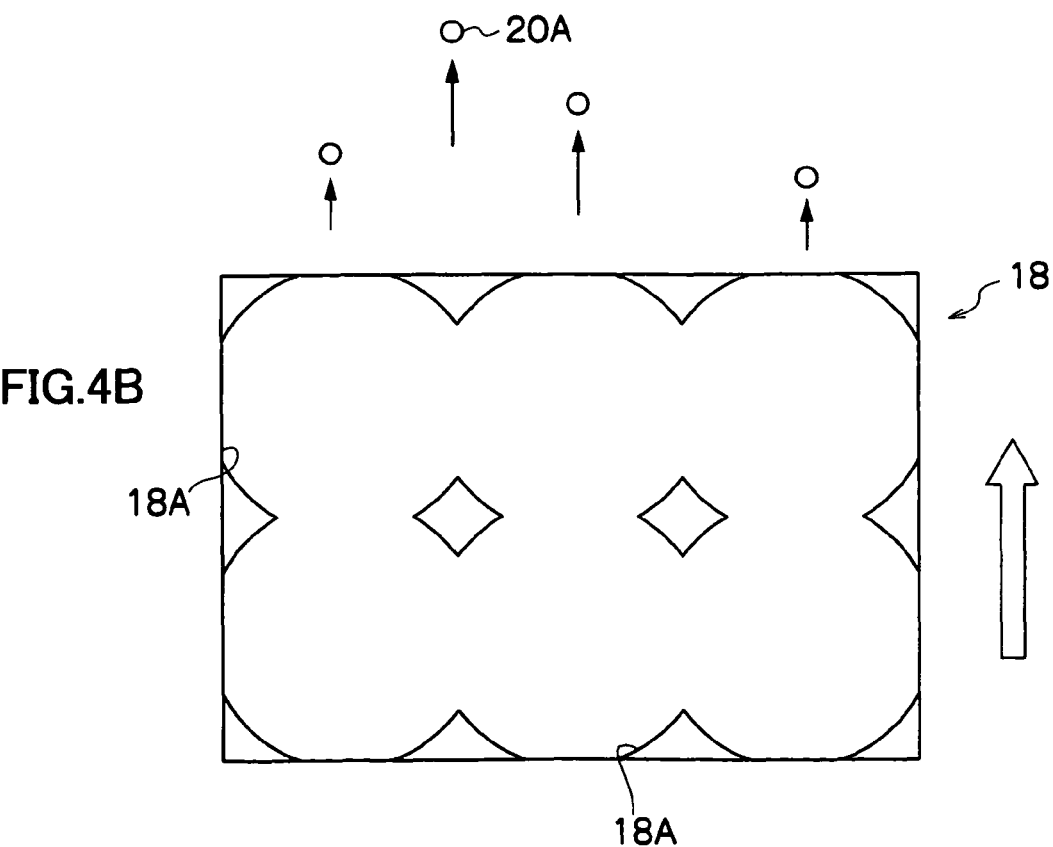

On the other hand, when the voltage is applied reversely to the first electrode 14 and the second electrode 16, an electric field (in the direction shown by an arrow in FIG. 4B) reverse to the above-mentioned electric field (in the direction shown by an arrow in FIG. 4A) is applied to the periodic structure 18. Owing to the reverse electric field, as shown in FIG. 4B, the mobile particles 20A successively come out of the porous structure 18A of the periodic structure 18. Since the mobile particles 20A disappear out of the porous structure 18A of the periodic structure 18, the average refractive index of the periodic structure 18 is changed and while the above-mentioned white color, red, green, and blue are successively exhibited, the color is changed to the black that is the structural color derived from the periodic structure 18.

In such a manner, the average refractive index of the periodic structure 18 is changed by the mobile particles 20A, so that the structural color can be changed and since the alteration degree of the average refractive index differs in accordance with the content of the mobile particles 20A in the porous structure, color modulating can be controlled by adjusting the content.

The adjustment of the content can be carried out properly by controlling the electric field intensity (applied voltage and current amount) and the duration.

Next, the second method will be described. To simplify the explanation, it will be explained with reference to FIG. 3 employed for the first method.

In the state where no voltage is applied to the first electrode 14 and the second electrode 16 as electric field application unit and as shown in FIG. 3A, the mobile particles 20A are substantially all dispersed in the dispersion medium 20, no mobile particle 20A moves to the porous structure of the periodic structure 18 and therefore, the reflected light of the periodic structure 18 is out of the visible light region.

Therefore, as shown in FIG. 3A, in the state where substantially all of the mobile particles 20A are dispersed in the dispersion medium 20, when being seen from the transparent substrate 11 side, the structural color (reflected light with wavelength out of the visible right region, e.g. black color) of the periodic structure 18 is exhibited as the color of the optical device 10.

When the voltage is applied to the first electrode 14 and the second electrode 16 to start electric field generation in the optical device 10 for moving the mobile particles 20A in the first electrode 14 side formed in the back substrate 12 side in the dispersion medium 20 at the mobility equal to or higher than the above-mentioned standard mobility, as shown in FIG. 3E, the mobile particles 20A enter the porous structure 18A of the periodic structure 18, move in the dispersion medium 20 at a higher speed than the speed moving in the porous structure, reach the surface of the periodic structure 18, and is layered on the periodic structure 18. Therefore, white color with high whiteness owing to the coagulation of the mobile particles 20A is exhibited as the color of the optical device 10.

Herein, the mechanism that the periodic structure 18 exhibits the structural color, the mechanism of color modulating by entering the mobile particles 20A in the porous structure of the periodic structure will be explained with reference to a colloidal crystal structure.

Figure 5:
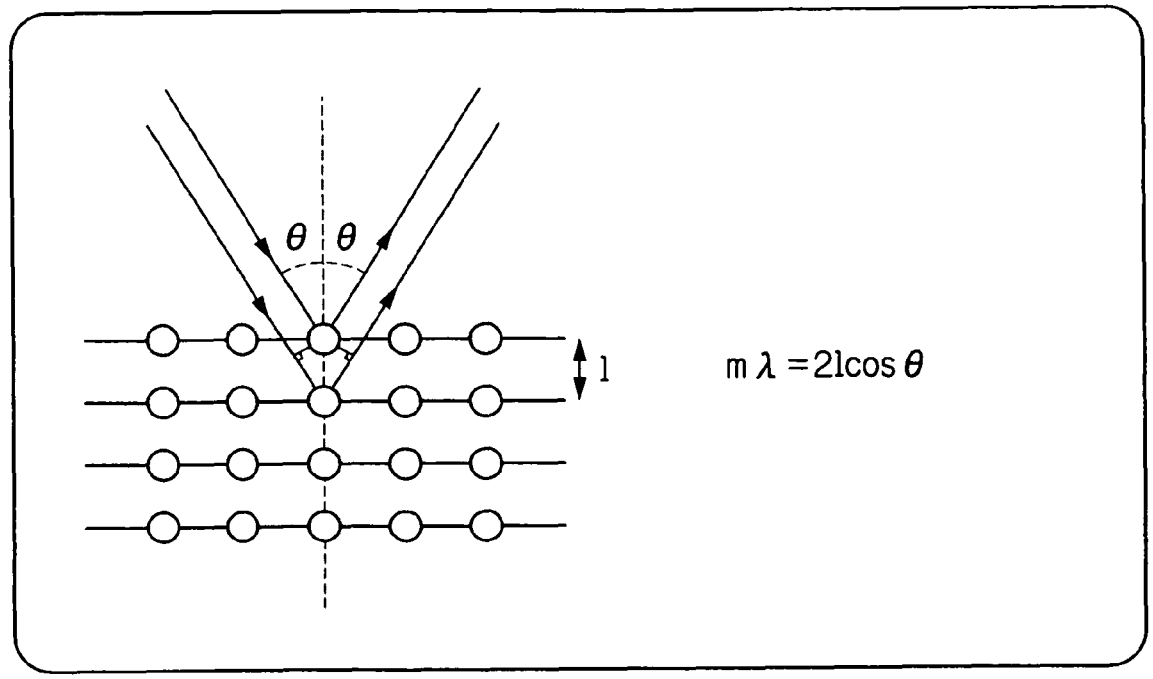
FIG. 5 is a diagram for explaining Bragg's law.

As shown in FIG. 5, the mechanism of the visible light interference by a colloidal crystal structure as the periodic structure (18) can be explained by employing Bragg's law (the following equation (1)) applied to crystal structure analysis by x-ray diffraction.

$$m\lambda = 2l \cos \theta \quad (1)$$

In the equation (1), m denotes a constant; λ denotes light wavelength; l denotes a lattice constant; and θ denotes an angle of inceidence. Herein, the x-ray diffraction technique cannot be applied as it is since the ratio of the wavelength and the scale of the object is considerably different in the interference of the colloidal crystal structure. That is, since the scale of the colloidal crystal structure is substantially similar to the wavelength of visible light, the effect of the refractive index has to be taken into consideration.

Figure 6:
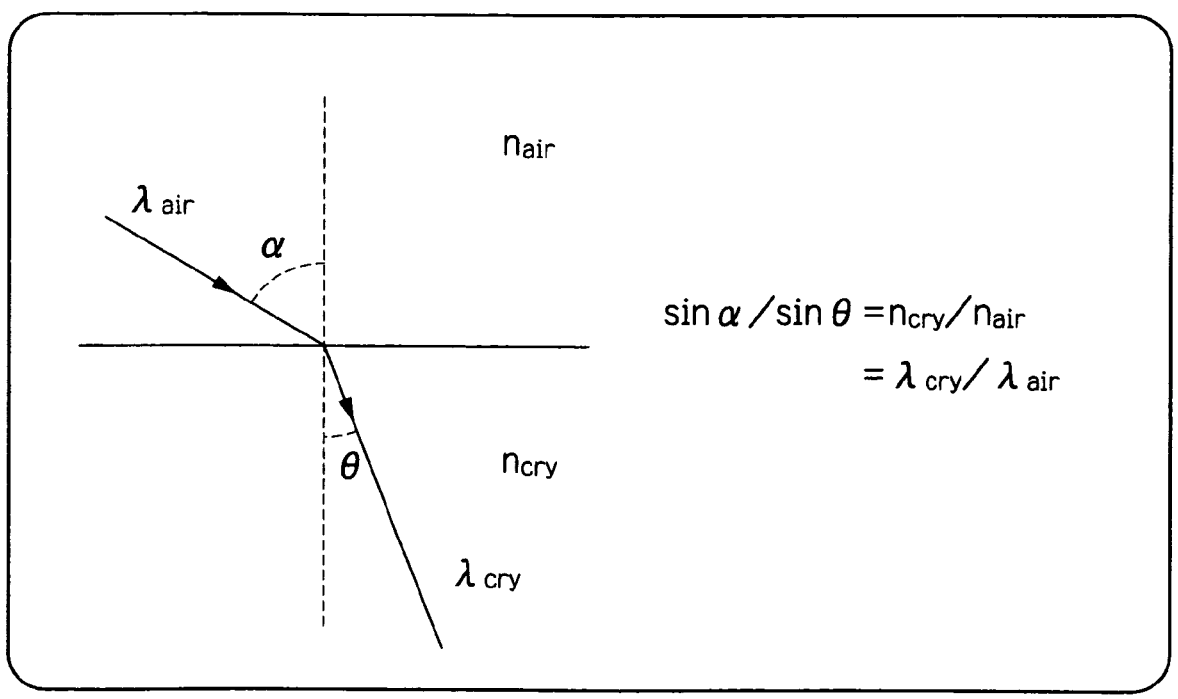
FIG. 6 is a diagram for explaining Snell's law.

As shown in FIG. 6, the correlation between the wavelength ($\lambda_{air}$) of the light coming at an angle of α and the wavelength ($\lambda_{cry}$) of the light refracted at an angle of θ by the colloidal crystal structure can be expressed by the following equation (2) (Snell's law) wherein the $n_{air}$ and $n_{cry}$ respectively denote the refractive indexes in the air and the colloidal crystal structure.

$$\frac{\sin\alpha}{\sin\theta} = \frac{n_{cry}}{n_{air}} = \frac{\lambda_{air}}{\lambda_{cry}} \quad (2)$$

Figure 7:
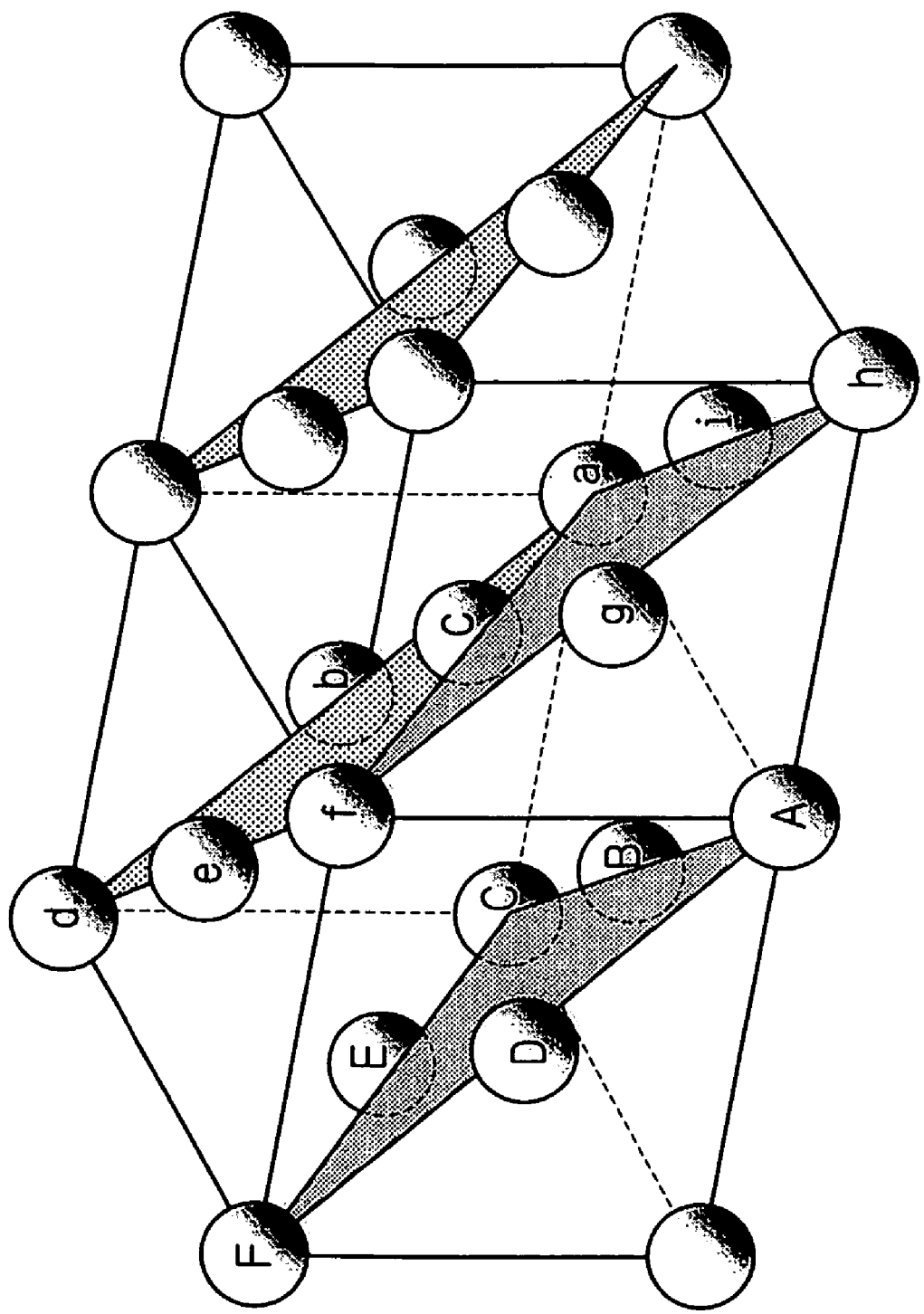
FIG. 7 is a schematic diagram showing the crystal structure of the face-centered cubic crystal.

Further, as shown in FIG. 7, since the colloidal crystal structure has (1 1 1) plane of the face-centered cubic crystal, which is most stable in terms of the energy, as the surface layer (ACF plane and hfda plane in FIG. 7), the lattice constant l can be expressed as the equation (2') wherein D denotes the particle diameter of the colloidal particles (volume average particle diameter) and the equation (3) can be deduced from the equations (1) and (2).

$$l = \sqrt{2/3}\, D \quad (2')$$

$$\lambda = 2\left(\frac{2}{3}\right)^{1/2} D\left[\left(\frac{n_{ave}}{n_{air}}\right)^2 - \sin^2\alpha\right]^{1/2} \quad (3)$$

$$(n_{ave}^2 = n_{air}^2 \phi_{air} + n_{cry}^2 \phi_{colloid})$$

Herein, in the equation (3), $n_{air}$ and $n_{cry}$ respectively denote the refractive indexes of the air and the colloidal crystal structure; $\phi_{air}$ and $\phi_{colloid}$ respectively denote the volume ratios of the air and the colloidal crystal structure; and $n_{ave}$ denotes the average refractive index of the material composing the colloidal crystal structure. In the case where λ becomes within the visible light region (400 nm to 800 nm), the structural color can be recognized.

The structural color can be adjusted by controlling the nano-order structure in such a colloidal crystal structure and producing the periodic structure with about light wavelength scale. The reflected light wavelength obtained by the most densely packed colloidal crystal structure can be expressed by the following equation (4) in consideration of the refractive index of the mobile particles (20A).

$$\lambda = 2\left(\frac{2}{3}\right)^{1/2} D\left[\left(\frac{n_{ave}^*}{n_{solution}}\right)^2 - \sin^2\alpha\right]^{1/2} \quad (4)$$

$$(n_{ave}^2 = n_{solution}^2 \phi_{cry} + n_{PC}^2 \phi_{air} + n_{particle}^2 \phi_{particle})$$

In the equation (4), $n_{solution}$, $n_{pc}$, and $n_{particle}$ respectively denote the refractive indexes of the dispersion medium, the colloidal crystal structure, and the mobile particles; $\phi_{particle}$ denotes the volume ratio of the mobile particle; and $\phi_{cry} = \phi_{colloid}$. In the case where the visible angle of the colloidal crystal structure is neglected (in the case where the visible angle can be neglected by improving the visible angle-dependency by the above-mentioned technique), the equation (4) can be rewritten as the equation (5).

$$\lambda = 2\left(\frac{2}{3}\right)^{1/2} D\left(\frac{n_{ave}^*}{n_{solution}}\right) \quad (5)$$

That is, the equation (5) proves that the structural color of the colloidal crystal structure is changed depending on the refractive index change by the mobile particles. Further, color modulating can be carried out depending on the amount (existence ratio) of the mobile particles.

The optical device (10) of the embodiment can carry out multicolor display and enable display with memory capability since particle movement is utilized. Further, at the time of multicolor display, since the volume of the multicolor display optical composition is not changed, the display in every one pixel can be carried out simply. Also, it is no need to use the third unit such as a color filter.

Figure 8:
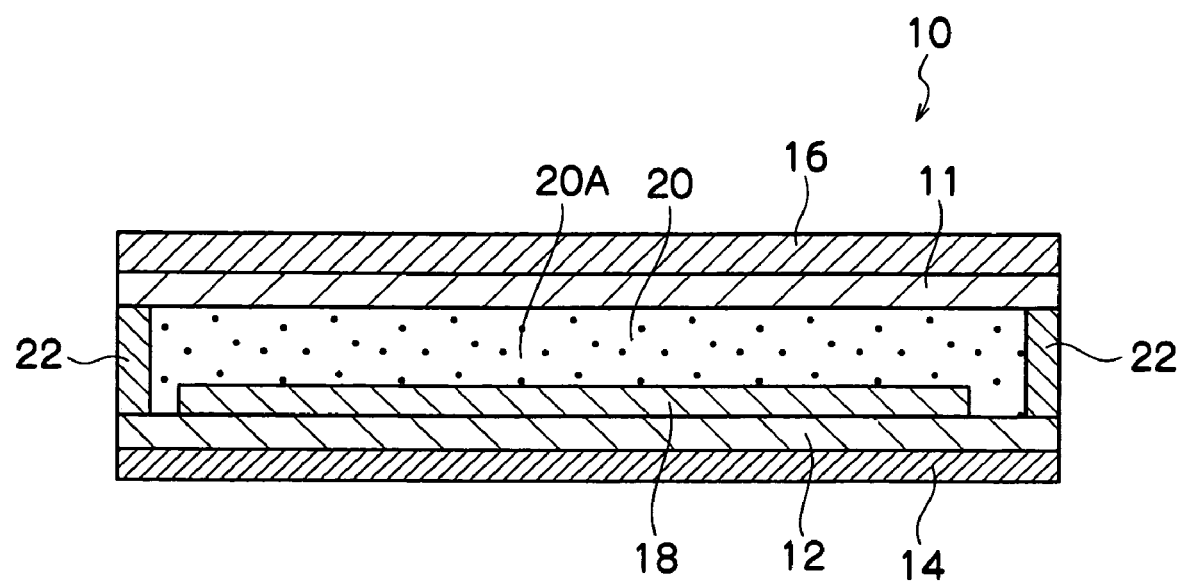
FIG. 8 is a schematic configurational diagram showing an optical device (10) of another embodiment of the invention.

With respect to the optical device (10) of the embodiment, although it is explained while the first electrode (14) and the second electrode (16) is arranged as the layering unit and selective arrangement unit for the optical device in contact with the periodic structure (18) and the dispersion medium (20) as the multicolor display optical composition, the first electrode (14) and the second electrode (16) may be arranged in non-contact state if they can apply an electric field to the periodic structure (18) and the first electrode 14 and the second electrode 16 may be arranged outer surfaces (non-opposite surface) of the transparent substrate 11 and the back substrate 12, as shown in FIG. 8.

Figure 9:
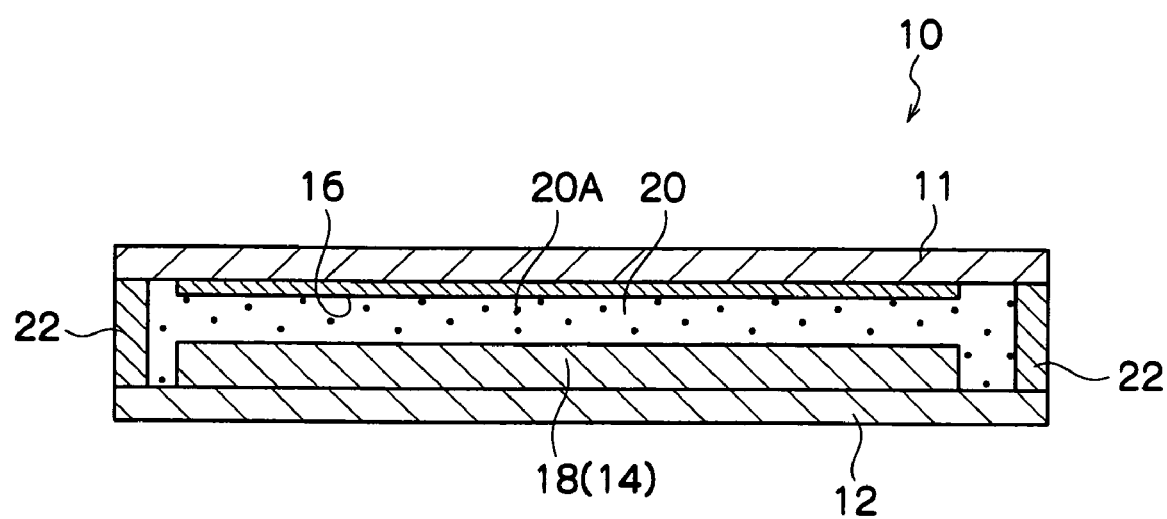
FIG. 9 is a schematic configurational diagram showing an optical device (10) of another embodiment of the invention.

Also, with respect to the optical device (10) of the embodiment, although it is explained while the first electrode (14) is separately installed as the electric field application unit, the periodic structure 18 may work also as the first electrode 14, as shown in FIG. 9 and accordingly, the space can be saved.

Also, with respect to the optical device (10) of the embodiment, the constitution of the minimum unit (one pixel unit) is explained and color display can easily be carried out by arranging minimum units in a matrix and composing one or a plurality of optical devices 10 with the above-mentioned constitution corresponding to the respective pixels for display.

Some embodiments of the invention are outlined below.

According to an aspect of the invention, a multicolor display optical composition comprises a light transmissive dispersion medium, a periodic structure arranged in the dispersion medium and having a porous structure to communicate between the inside and the outside, and mobile particles contained in the dispersion medium so as to be movable and having a volume average primary particle diameter of 1 nm or larger and 80 nm or smaller in dispersion state in the dispersion medium, a volume average particle diameter of coagulated particles of 100 nm or larger in optical coagulation state by stimulation application, and having a refractive index different from that of the dispersion medium by 0.1 or more.

The mobile particles may show no coloration in the dispersion state that the particles are dispersed in the dispersion medium and may show white coloration with a predetermined whiteness or higher in the coagulation state in which the particles coagulated.

The mobile particles may be selectively arranged in the inside or the outside of each periodic structure.

The mobile particles may be particles movable in an electric field or particles movable in a magnetic field.

The mobile particles may be particles of at least one kind of materials selected from titanium oxide, silica, and zinc oxide.

The mobile particles may have a refractive index in a range from 0.01 to 3.

Each periodic structure may be a porous structure.

The periodic structure may be a structure selected from positive working structures selected from a colloidal crystal structure, a micro-domain structure or negative working structures formed by using these positive working structures as a template.

The refractive index of the material of the periodic structure may be in a range from 1.3 to 4.0.

The material of the periodic structure may be colored.

The material of the periodic structure may not be colored.

According to another aspect of the invention, an optical device comprises a pair of substrates and between the substrates being arranged a light transmissive dispersion medium, a periodic structure arranged in the dispersion medium and having a porous structure to communicate between the inside and the outside, and mobile particles contained in the dispersion medium so as to be movable and having a volume average primary particle diameter of 1 nm or larger and 80 nm or smaller in dispersion state in the dispersion medium, a volume average particle diameter of coagulated particles of 100 nm or larger in optical coagulation state by stimulation application, and having a refractive index different from that of the dispersion medium by 0.1 or more.

The optical device may comprise a layering unit for layering the above-mentioned mobile particles on the surface of each of the above-mentioned periodic structures.

The layering unit may include a selective arrangement unit for selectively arranging the mobile particles in the inside of the outside of the porous structure of the periodic structure.

The layering unit may be an electric field application unit or a magnetic field application unit.

One of the pair of the electrodes may be colored or may contain a colored body.

According to another aspect of the invention, a display method of an optical device comprising: layering the mobile particles at least on the surface of the periodic structures, and the optical device comprises a pair of substrates and between the substrates being arranged a light transmissive dispersion medium, a periodic structure arranged in the dispersion medium and having a porous structure to communicate between the inside and the outside, and mobile particles contained in the dispersion medium so as to be movable and having a volume average primary particle diameter of 1 nm or larger and 80 nm or smaller in dispersion state in the dispersion medium, a volume average particle diameter of coagulated particles of 100 nm or larger in optical coagulation state by stimulation application, and having a refractive index different from that of the dispersion medium by 0.1 or more.

The display method may further involve moving the mobile particles into the inside of the porous structure of the periodic structure and moving the mobile particles to the outside of the porous structure of the periodic structure.

The multicolor display may be carried out by changing the content of the mobile particles in the space of the porous structure of the periodic structure.

EXAMPLES

Hereinafter, the present invention will be described more specifically in detail along with examples. However, the invention should in no sense be limited to these respective examples. In the examples, devices with the structure same as the optical device (10) shown in FIG. 1 are produced and evaluated.

Example 1

A glass substrate (3 cm×5 cm, thickness 2 mm) bearing a smooth ITO electrode and partially masked (exposed portion of the substrate surface is 2 cm×2 cm) is immersed in an ethanol suspension containing a predetermined amount of mono-dispersed polystyrene particles with a volume average primary particle diameter of 300 nm (trade name: Estapor ES-K030, manufactured by Merck Chime. S.A., S) to form a most-densely-packed type colloid crystal in which the polystyrene particles are orderly arranged in about 10 layers on the substrate (on the ITO surface) in a surface area of 2 cm×2 cm by dip coating method.

Herein, the pulling speed of the substrate is adjusted to be 0.5 μm/s and the thickness of the most-densely-packed type colloid crystal is adjusted to be about 2.7 μm. The obtained most-densely-packed type periodic structure has a structural color (pale blue color) and it is confirmed that the crystal has the (1 1 1) plane in the surface layer and the face-centered cubic lattice form by a scanning electron microscope (SEM).

Next, this colloidal crystal structure is used as a template and a UV-setting resin precursor (Aronix UV manufactured by Toagosei Chemical Industry Co., Ltd.) is dropwise added to fill the spaces among the particles of the structure are impregnated with it and successively ultraviolet rays are irradiated to cure the resin (the refractive index of the cured resin is about 1.5). After the curing, the surface is polished to expose the polystyrene particles and successively, the polystyrene particles are eluted by etching with an organic solvent to obtain a porous structure (a periodic structure) having pores formed by using the polystyrene particles as templates. The obtained porous structure has a thickness of about 2.6 μm and exhibits a pale blue structural color in air.

When the porous structure is observed by SEM, the obtained structure is a porous structure (equivalent to the periodic structure of the invention) with a substantially reversed structure of the periodic structure of the polystyrene particles and the diameter of the pores are about 280 nm. It is confirmed that the respective pores are connected one another and the structure has a continuous phase (equivalent to the porous structure of the invention). The maximum size of the porous structure is about 90 nm and the maximum aperture of the pores in the outermost surface (the communication path) is about 150 nm.

The volume of the porous structure is about 75% in the periodic structure according to the measurement result.

An ethanol dispersion medium (refractive index of ethanol: 1.36) is produced by dispersing titanium oxide particles (specific gravity of titanium oxide: about 4, refractive index: about 2.7) having volume average primary particle diameter of about 10 nm in the dispersion state in about 20% by weight in ethanol as a dispersion medium. The dispersion medium is substantially transparent.

The viscosity of the ethanol is about 1.2 mPa.s and the relative dielectric constant is about 23.

A resin spacer layer with a height of 100 μm is formed along the outer circumferential part of the layer (2 cm×2 cm) of the porous structure on the above-mentioned glass substrate on which the porous structure (the periodic structure) is formed and another glass substrate bearing an ITO electrode is overlaid in a manner that the electrodes are disposed oppositely and 0.04 ml of the ethanol dispersion medium containing the titanium oxide particles is injected through an aperture formed partially into the space between both substrates.

The ratio of the total volume of the porous structure of the above-mentioned porous structure (the periodic structure) and the total volume of the titanium oxide particles contained in the ethanol dispersion medium becomes 1:1.28 and thus titanium oxide particles exist in the volume excess to the total volume of the voids of the porous structure.

In the above-mentioned manner, the optical device (10) is produced.

The produced optical device (10) is substantially colorless and in the case where the optical device (10) is put on a black film (a light absorption layer), it exhibits black.

In the state where the black film (the light absorption layer) is put on the back surface of the optical device (10), the electrode of the glass substrate on which the porous structure is formed is used as a negative electrode and the electrode of the glass substrate disposed oppositely on the former glass substrate through the porous structure and the ethanol dispersion medium is used as a positive electrode and voltage of −3 V is applied to cause change of the structural color of the porous structure (the periodic structure) to be black, blue, green, and red successively with the lapse of time and finally to white. Meanwhile, when voltage with reversed polarity is applied, the color is changed from white color to the black successively in the reversed order and thus the color is changed reversely.

It is found by optical microscopic observation of the cell inside in the color change that the titanium particles are layered while they are coagulated on the surface of the porous structure when white color is exhibited and that the light scattering is carried out by the coagulation of the titanium oxide particles. It is also found that the titanium oxide particles in the coagulation state has a coagulation particle diameter of 0.2 μm or larger. On the other hand, during the time of the color change from black to blue, green and red, no layer formation of the titanium oxide particles in coagulated state on the surface of the porous structure is observed.

The volume average particle diameter of the coagulated particles in the state where white color is exhibited and the titanium oxide particles are layered and the titanium particles are coagulated, that is optical coagulation state, is found to be 200 nm or larger by SEM observation.

The ISO whiteness of the optical device (10) at the time when the white color is exhibited is measured by an ISO whiteness meter (TB-1) manufactured by Matsubo Co., Ltd. to find it is about 50% and the whiteness is very high.

Accordingly, with respect to the constitution of the invention, it is confirmed that the structural color of a periodic structure can be changed to three primary colors by moving mobile particles in a porous structure of a periodic structure having the porous structure, thereby adjusting the content of the mobile particles in the porous structure of the periodic structure, and accordingly changing the refractive index of the periodic structure and at the same time, it is also confirmed that white color with high whiteness can be exhibited by entirely occupying the porous structure with the mobile particles and temporarily coagulating the mobile particles on the surface of the periodic structure.

According to an aspect of the invention, a multicolor display optical composition, an optical device, and a display method of the optical device can be provided.

Example 2

Using the same titanium oxide particles as those in Example 1, an optical device (10) is produced in the same manner as Example 1, except that an ethanol dispersion medium is produced by dispersing the titanium oxide particles in a concentration of 10% by weight in ethanol as the dispersion medium (the same as Example 1).

In the case where the concentration of the titanium oxide particles in the dispersion medium is 10% by weight, the ratio of the total volume of the voids in the porous structure of the porous structure (the periodic structure) and the total volume of the titanium oxide particles contained in the ethanol dispersion medium is 1:0.64 and the titanium oxide particles exist in an amount relatively lower than the total volume of the pores of the porous structure.

The produced optical device (10) is substantially colorless and in the case where the optical device (10) is put on a black film (a light absorption layer), it exhibits black.

In the state where the black film (the light absorption layer) is put on the back surface of the optical device (10), the electrode of the glass substrate on which the porous structure is formed is used as a negative electrode and the electrode of the glass substrate disposed oppositely on the former glass substrate through the porous structure and the ethanol dispersion medium is used as a positive electrode and voltage of −3 V is applied in the same manner as Example 1 to cause change of the structural color of the porous structure (the periodic structure) to be black, blue, green, and red successively with the lapse of time, however it does not become white.

Meanwhile, when the electrode of the glass substrate on which the porous structure is formed is used as a positive electrode and the electrode of the glass substrate disposed oppositely on the former glass substrate through the porous structure and the ethanol dispersion medium is used as a negative electrode and voltage of −3 V is applied, the color is changed from red to green, blue and black successively. Accordingly, the color change is found reversible.

With respect to the optical device (10) exhibiting black, when the electrode of the glass substrate on which the porous structure is formed is used as a negative electrode and the electrode of the glass substrate disposed oppositely on the former glass substrate through the porous structure and the ethanol dispersion medium is used as a positive electrode and voltage of −30 V is applied, the color is changed from black to white as soon as the voltage application. This change is also reversible.

It is found by optical microscopic observation of the cell inside in the color change that the titanium particles are layered while they are coagulated on the surface of the porous structure when white color is exhibited and that the light scattering is carried out by the coagulation of the titanium oxide particles.

The volume average particle diameter of the coagulated particles in the state where white color is exhibited and the titanium oxide particles are layered and the titanium particles are coagulated, that is optical coagulation state, is found to be 200 nm or larger by SEM observation.

The ISO whiteness of the optical device (10) at the time when the white color is exhibited is measured in the same manner as Example 1 to find it is about 40% and the whiteness is very high.

It is confirmed that continuous color modulating of the periodic structure can be carried out by changing the intensity of the application voltage and white color with high whiteness can be exhibited.

Example 3

A smooth silicon substrate (3 cm×5 cm, thickness 2 mm) is immersed in an ethanol suspension containing a predetermined amount of mono-dispersed silica particles with a volume average primary particle diameter of 300 nm (trade name: Seahostar KE-W30, manufactured by Nippon Shokubai Co., Ltd.) to form a most-densely-packed type colloid crystal in which the silica particles are orderly arranged in about 10 layers on the substrate.

Herein, the pulling speed of the substrate is adjusted to be 0.5 μm/s and the thickness of the most-densely-packed type colloid crystal is adjusted to be about 2.7 μm. The obtained most-densely-packed type colloidal crystal has a structural color (pale blue color) and it is confirmed that the crystal has the (1 1 1) plane in the surface layer and the face-centered cubic lattice form by a scanning electron microscope (SEM).

Next, this colloidal crystal structure is used as a template and the spaces among the particles of the structure are filled with a furfuryl alcohol resin and successively the structure is calcinated at 1000° C. and then, the silica colloidal crystal structure is etched with a hydrofluoric acid to obtain a carbon structure of carbon with a thickness of 5 μm (periodic structure: a negative working structure). The obtained carbon structure has structural color (pale blue). The diameter of the pores is about 280 nm. SEM observation makes it clear that the obtained structure has a porous body having the same porous structure as the silica colloidal crystal structure and all of the pores are connected. The maximum size of the through porous structure is about 90 nm. The maximum aperture of the pores in the outermost surface (the communication path) is about 150 nm.

The volume of the porous structure is about 75% in the periodic structure according to the measurement result.

On the other hand, in the same manner as Example 1, an ethanol dispersion medium is produced by dispersing the titanium oxide particles with a volume average primary particle diameter of about 10 nm (the specific gravity of titanium oxide: about 4, the refractive index: about 2.7) in a concentration of 20% by weight in ethanol as the dispersion medium (the refractive index of ethanol: 1.36). The dispersion medium is substantially transparent.

A resin spacer layer with a height of 100 μm is formed along the outer circumferential part of the layer (2 cm×2 cm) of the carbon structure on the above-mentioned silicon substrate on which the carbon structure (the periodic structure) is formed and another glass substrate bearing an ITO electrode is overlaid in a manner that the electrodes are disposed oppositely and 0.04 ml of the ethanol dispersion medium containing the titanium oxide particles is injected through an aperture formed partially into the space between both substrates.

The above-mentioned carbon structure (the periodic structure) is used as a first electrode and the above-mentioned ITO electrode is used as a second electrode.

The ratio of the total volume of the pores as the porous structure of the above-mentioned carbon structure (the periodic structure) and the total volume of the titanium oxide particles contained in the ethanol dispersion medium becomes 1:1.28 and thus titanium oxide particles exist in the volume excess to the total volume of the pores of the porous structure.

In the above-mentioned manner, the optical device (10) is produced.

The optical device (10) produced has substantially black. Electric wiring is connected to the optical device (10) and in the case where the carbon structure is used as the negative electrode (the first electrode) and the ITO electrode (the second electrode) is used as a positive electrode and voltage of −3 V is applied, the color of the carbon structure (the periodic structure) is changed successively to be black, blue, green, and red with the lapse of time and finally to white. On the other hand, when −3 V voltage is applied while the carbon structure is used as the positive electrode (the first electrode) and the ITO electrode (the second electrode) is used as a negative electrode, the color is changed from white to red, green, blue and black successively in the reversed order and thus the color change is found reversible.

It is found by optical microscopic observation of the optical device (10) inside in the color change that the titanium particles are layered while they are coagulated on the surface of the carbon structure when white color is exhibited and that the light scattering is carried out by the coagulation of the titanium oxide particles. On the other hand, in the color change from black to blue, green, and red successively, no layer formation in the coagulated state of the titanium particles on the surface of the carbon structure is observed.

The volume average particle diameter of the coagulated particles in the state where white color is exhibited and the titanium oxide particles are layered and the titanium particles are coagulated, that is optical coagulation state, is found to be 200 nm or larger by SEM observation.

The ISO whiteness of the optical device (10) at the time when the white color is exhibited is measured in the same manner as Example 1 to find it is about 40% and the whiteness is very high.

Accordingly, with respect to the constitution of the invention, it is confirmed that the structural color of the carbon structure can be changed to three primary colors by moving mobile particles in a porous structure of the carbon structure having the porous structure, thereby adjusting the content of the mobile particles in the porous structure of the carbon structure, and accordingly changing the refractive index of the carbon structure and at the same time, it is also confirmed that white color with high whiteness can be exhibited by temporarily coagulating the mobile particles on the surface of the carbon structure.

Example 4

Example Using Magnetic Mobile Particles

Crosslinked polystyrene type polymer particles (magnetic particles) containing paramagnetic metal oxide (ferrite) particles and titanium oxide particles as mobile particles are produced by an emulsion polymerization method. The volume average particle diameter is 50 nm. The specific gravity of the magnetic particles is about 2.5. The refractive index is 1.8.

An ethanol dispersion medium is produced by dispersing the magnetic particles in a concentration of 12.5% by weight in ethanol (same as that in Example 1) as a dispersion medium.

Using the same porous structure used in Example 1 and in the same manner as Example 1, an optical device in which 0.04 ml of the above-mentioned dispersion medium is enclosed is produced.

The ratio of the total volume of the porous structure of the above-mentioned porous structure (the periodic structure) and the total volume of the magnetic particles contained in the ethanol dispersion medium becomes 1:1.28 and thus magnetic particles exist in the volume excess to the total volume of the pores of the porous structure.

The optical device produced in the above-mentioned manner is substantially colorless and in the case where the optical device is put on a black film (a light absorption layer), it exhibits black.

In the state where the black film (the light absorption layer) is put on the back surface of the optical device, when a magnetic field is applied from the outside of the element by an electromagnet, the structural color of the porous structure (the periodic structure) is changed from black to blue, green, and red successively with the lapse of time and finally to white. Meanwhile, when the magnetism is reversed, the color is changed from white to the black successively in the reversed order and thus the color is changed reversely.

It is found by optical microscopic observation of the cell inside in the color change that the magnetic particles are layered while they are coagulated on the surface of the porous structure when white color is exhibited and that the light scattering is carried out by the coagulation of the magnetic particles. It is also found that the magnetic particles in the coagulation state has a coagulation particle diameter of 0.2 μm or larger.

Further, the ISO whiteness of the optical device (10) at the time when the white color is exhibited is measured by an ISO whiteness meter (TB-1) manufactured by Matsubo Co., Ltd. to find it is about 40% and the whiteness is very high.

Accordingly, with respect to the constitution of the invention, it is confirmed that the structural color of a periodic structure can be changed to three primary colors by moving mobile particles magnetically to a porous structure of a periodic structure having the porous structure, thereby adjusting the content of the mobile particles in the porous structure of the periodic structure, and accordingly changing the refractive index of the periodic structure and at the same time, it is also confirmed that white color with high whiteness can be exhibited by entirely occupying the porous structure with the mobile particles and temporarily coagulating the mobile particles on the surface of the periodic structure.

What is claimed is:

1. An optical device comprising a pair of substrates, and between the substrates are arranged a light transmissive dispersion medium, a periodic structure arranged in the dispersion medium and having a porous structure inside communicated with the outside, and mobile particles contained in the dispersion medium so as to be movable and having a volume average primary particle diameter of 1 nm or larger and 80 nm or smaller in the dispersion state in the dispersion medium, a volume average particle diameter of coagulated particles of 100 nm or larger in optical coagulation state by applying a voltage, and having a refractive index different from that of the dispersion medium by 0.1 or more, the mobile particles being present in the dispersion medium irrespective of said voltage.

2. The optical device of claim 1 further comprising a layering unit for layering the mobile particles on the surface of the periodic structure.

3. The optical device of claim 2, wherein the layering unit includes a selective arrangement unit for selectively arranging the mobile particles in the inside or the outside of the porous structure of the periodic structure.

4. The optical device of claim 2, wherein the layering unit is an electric field application unit or a magnetic field application unit.

5. The optical device of claim 1, wherein one of the substrates of the pair of substrates is colored or has a colored body.

* * * * *